United States Patent
Chiang et al.

(10) Patent No.: US 7,684,650 B2
(45) Date of Patent: Mar. 23, 2010

(54) METHOD FOR PROCESSING IMAGE FRAME OUTPUT FROM AN IMAGE SENSOR BY AN IMAGE PROCESSOR

(75) Inventors: Chin-Yi Chiang, Taipei (TW); Wallace Huang, Taiepi (TW)

(73) Assignee: Via Technologies, Inc., Taipei (TW)

( * ) Notice: Subject to any disclaimer, the term of this patent is extended or adjusted under 35 U.S.C. 154(b) by 1108 days.

(21) Appl. No.: 11/330,920

(22) Filed: Jan. 11, 2006

(65) Prior Publication Data

US 2006/0159349 A1 Jul. 20, 2006

(30) Foreign Application Priority Data

Jan. 14, 2005 (TW) .............. 94101213 A

(51) Int. Cl.
*G06K 9/54* (2006.01)
*G06K 9/36* (2006.01)
*G06K 9/46* (2006.01)

(52) U.S. Cl. ................... 382/305; 382/284
(58) Field of Classification Search ........... 382/162, 382/164, 173, 232, 236, 238, 240, 303, 305, 382/312, 284; 348/425.1, 700; 375/240.19, 375/240.21, E7.094, E7.211; 709/227; 710/260, 710/261, 305; 370/401, 464, 477
See application file for complete search history.

(56) References Cited

U.S. PATENT DOCUMENTS

| | | | | | |
|---|---|---|---|---|---|
| 5,282,208 | A * | 1/1994 | Takayama et al. | ........... | 370/477 |
| 5,367,641 | A * | 11/1994 | Pressprich et al. | .......... | 710/305 |
| 5,539,527 | A * | 7/1996 | Kajimoto et al. | ............. | 386/52 |
| 6,185,340 | B1 * | 2/2001 | Comer | ...................... | 382/236 |
| 6,486,918 | B1 * | 11/2002 | Min | ....................... | 348/425.1 |
| 7,027,450 | B2 * | 4/2006 | Collette et al. | ............. | 370/401 |
| 7,043,584 | B2 * | 5/2006 | Schultz | ...................... | 710/261 |
| 2005/0195334 | A1 * | 9/2005 | Yeh et al. | .................... | 348/700 |
| 2006/0159349 | A1 * | 7/2006 | Chiang et al. | ............... | 382/232 |

* cited by examiner

*Primary Examiner*—Amir Alavi
(74) *Attorney, Agent, or Firm*—Kirton & McConkie; Evan R. Witt

(57) ABSTRACT

In an image-frame processing method, the image frame is outputted from and image sensor by an image processor via the buffering of a memory buffer. The method includes the following steps of: defining at least two storage spaces in the memory buffer; dividing the image frame into a plurality of image portions, each of which has a size corresponding to the size of one of said at least two storage spaces; sequentially storing the image portions into the storage spaces in turn; and sequentially processing said image portions stored in the memory buffer. This method is applicable to processing the image frame with the use of a small-sized memory buffer.

9 Claims, 10 Drawing Sheets

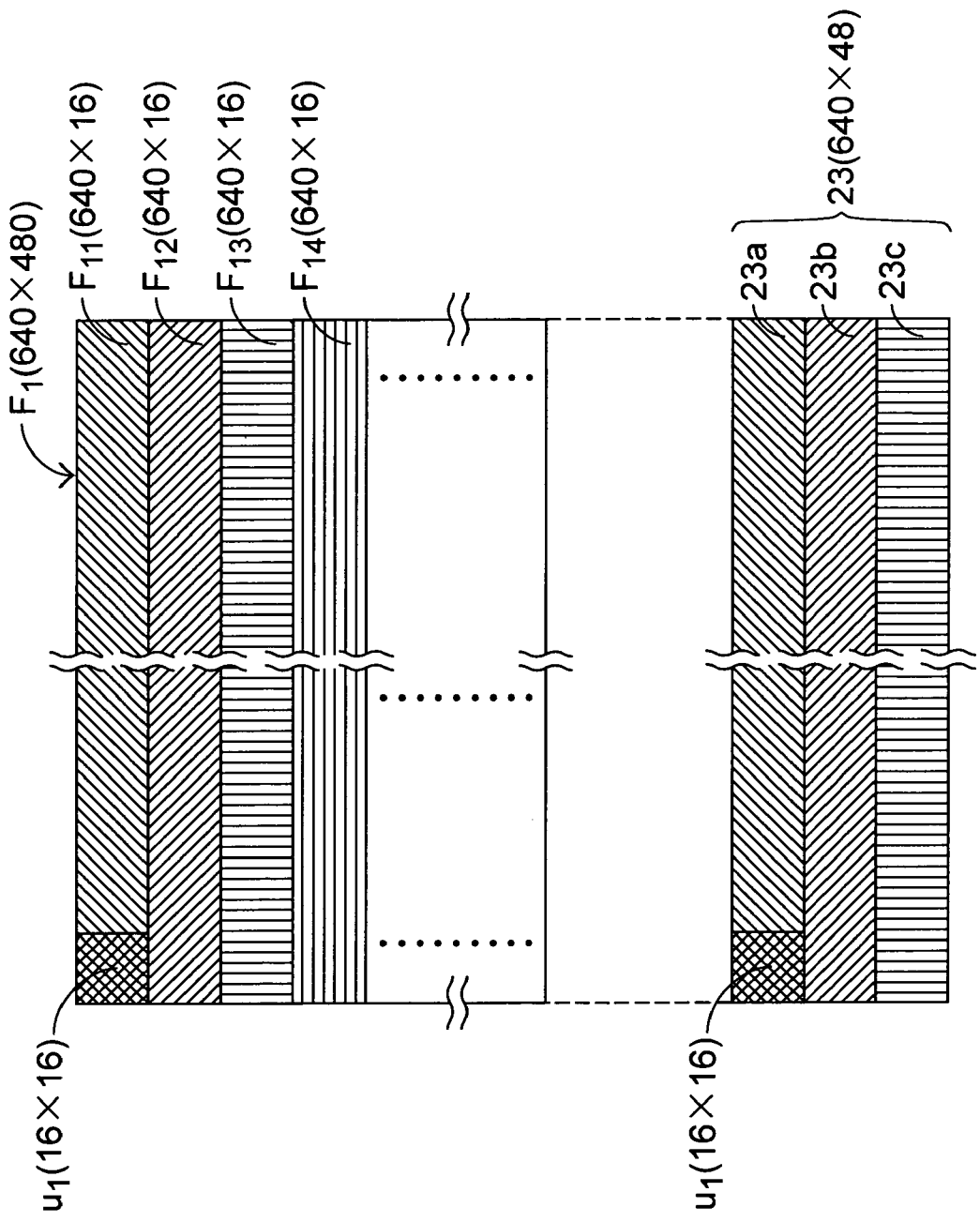

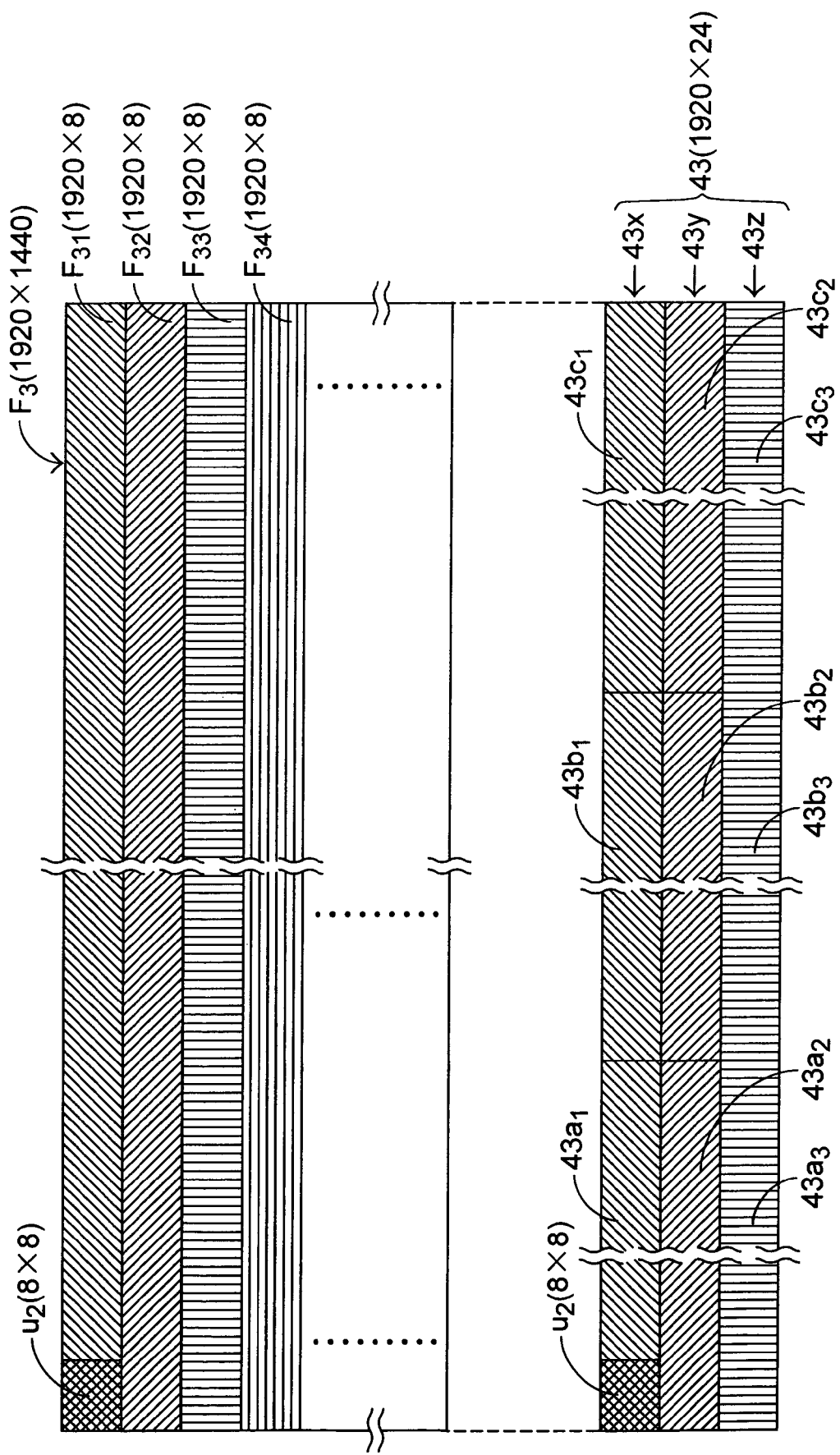

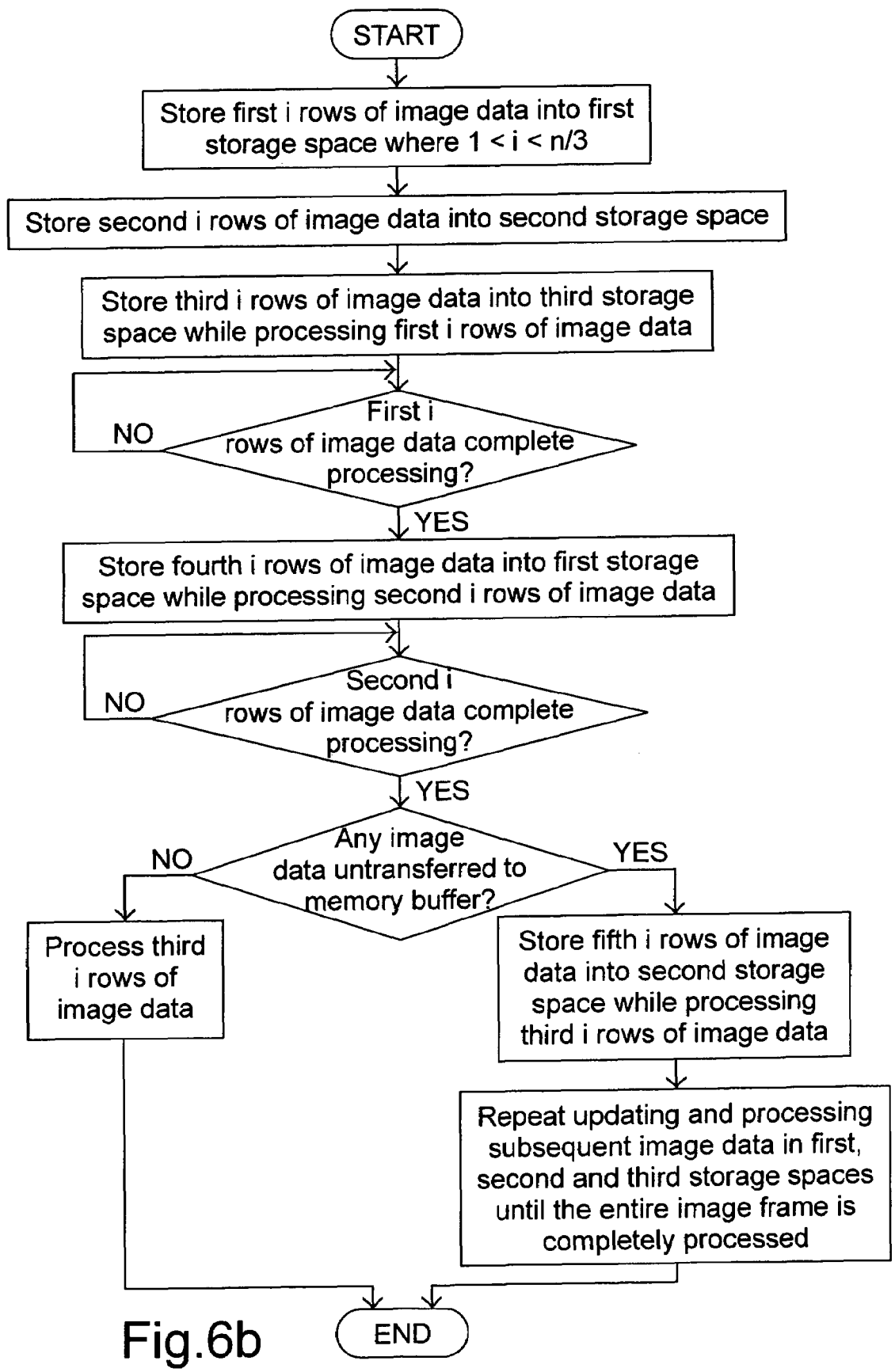

METHOD FOR PROCESSING IMAGE FRAME OUTPUT FROM AN IMAGE SENSOR BY AN IMAGE PROCESSOR

FIELD OF THE INVENTION

The present invention relates to a method for processing an image frame, and more particularly to a method for processing an image frame with the use of a small-sized memory buffer.

BACKGROUND OF THE INVENTION

With highly development and improvement of image-processing techniques, various electronic apparatuses including web camera, digital camera, cellular and picture phone, personal digital assistant (PDA), multimedia computer, etc., take advantages of these techniques to get well developed and enhanced. FIG. 1 shows a typical real-time image transmission architecture for implementing a digital image processing technique, wherein an image sensor 11, an image processor 12 with digital signal processing (DSP) function, and a memory buffer 13 are shown. The image sensor 11 picks up image of an object (now shown) under exposure and outputs the resulting image frame within a specified period of time for image-frame processing. Then the image processor 12 stores the image frame into the memory buffer 13 for subsequent processing. The image frame processed by the image processor 12 is optionally outputted to a computer or an image storage apparatus for further processing.

In the above-descried architecture, the image sensor 11 is generally implemented with a CMOS sensor or a CCD sensor, and the image processor 12 can be a digital signal processor (DSP). The image frame is generally presented in either RGB or YCbCr format depending on the choice of the image sensor 11. When the DSP 12 is to do a JPEG compression of the image frame, however, the image frame has to be in YCbCr format. Hence, it is necessary to use an image sensor capable of generating image data in YCbCr format to serve as the image sensor 11. Otherwise, if an RGB-type image sensor is used as the image sensor 11, additional RGB to YCbCr conversion has to be performed before the image data can be compressed by the image processor 12.

Conventionally, an image frame is stored in the memory buffer 13 and accessed by the image processor 12 as a whole. Therefore, the capacity of the memory buffer 13 should be large enough to accommodate the entire image frame. Moreover, under the requirement of receiving next image frame while processing currently stored image frame, the capacity of the memory buffer 13 should be enlarged to a level able to accommodate at least two image frames so as to prevent from improperly overwriting image data. Taking a VGA image frame consisting of 640×480 pixels for example, the storage capacity of the memory buffer 13 should be equal to or larger than (640×480 bytes)×3×2, which is about 1.8 MB. It is difficult to integrate such a large-sized memory buffer 13 with the image processor 12, and thus the memory buffer 13 generally stands alone. It is apparent that such arrangement is inefficient in manufacturing process and production cost.

SUMMARY OF THE INVENTION

Therefore, the present invention provides a method for processing an image frame with the use of a small-sized memory buffer.

The present invention provides a method for processing an image frame which is outputted from an image sensor by an image processor via the buffering of a memory buffer. The method includes step of: defining at least two storage spaces in the memory buffer; dividing the image frame into a plurality of image portions, each of which has a size corresponding to the size of one of the storage spaces; sequentially storing the image portions into the storage spaces in turn; and sequentially processing the image portions stored in the memory buffer.

In an embodiment, the processing step for processing a previously stored image portion and the storing step for storing a subsequent image portion are performed simultaneously.

In an embodiment, the processing step performs a JPEG or MPEG compression operation based on sub-sampling algorithm.

In an embodiment, the image frame has a size of m×n and the memory buffer consists of two storage spaces. Each of the image portions has a size of m×p, and each of the storage spaces has a size of m×p, where m, n and p are positive integers, and p is less than n/2. The processing unit for the JPEG or MPEG compression operation is 8×8 or 16×16, and the parameter p is a corresponding value, i.e. 8 or 16.

In another embodiment, the image frame has a size of m×n and the memory buffer consists of three storage spaces. Each of the image portions has a size of m×q, and each of the storage spaces has a size of m×q, where m and q are positive integers, and q is less than n/3.

For example, the image frame is presented in RGB or YCbCr format. The image frame may has a size of 352×288, 640×480, 704×480, 704×576, 1024×768, 1280×1024, 1440×900, 1600×1200, or 1920×1440.

The present invention also provides an image-frame processing method. The image frame includes at least first, second and third image portions, and the memory buffer including at least first and second storage spaces. The method includes the following steps of: storing the first image portion into the first storage space; storing the second image portion into the second storage space while performing a first image-processing operation of the first image portion stored in the first storage space; and storing the third image portion into the memory buffer while performing a second image-processing operation of the second image portion stored in the second storage space.

In an embodiment, the first storage space, the second storage space, the first image portion, the second image portion, and the third image portion all have the same size.

For example, the first storage space and the second storage space both have a size of 640×16. The first image portion, the second image portion and the third image portion all have a size of 1280×8. A half of the first storage space and a half of the second storage space combined to store one of the first image portion, the second image portion and the third image portion. The image portions are sequentially stored into the storage spaces in turn until the entire image frame is completely processed.

The present invention further provides an image-frame processing method. At first, the memory buffer is patterned to consist of a plurality of storage parts, and the image frame is divided into a plurality of image portions. Then the storage parts are optionally combined to provide at least two storage spaces, each of which has a size corresponding to the size of the image portion. By sequentially storing the image portions into the storage spaces in turn and sequentially processing the image portions stored in the memory buffer, the image fame can be completely processed.

In one embodiment, each storage space consists of at least two storage parts, while each storage part has a size of 640×8.

BRIEF DESCRIPTION OF THE DRAWINGS

The above contents of the present invention will become more readily apparent to those ordinarily skilled in the art after reviewing the following detailed description and accompanying drawings, in which:

FIG. 3 is a schematic diagram illustrating the use of a 640×48 memory buffer to process a 640×480 image frame under a tri-buffer architecture according to the second embodiment of the present invention;

FIG. 5a~5c are schematic diagrams illustrating the use of a 1920×24 memory buffer to process image frames with various sizes according to the fifth embodiment of the present invention;

FIG. 6b is a flowchart illustrating an image frame processing method under a tri-buffer architecture according to the present invention.

DETAILED DESCRIPTION OF THE PREFERRED EMBODIMENT

Figure 1:
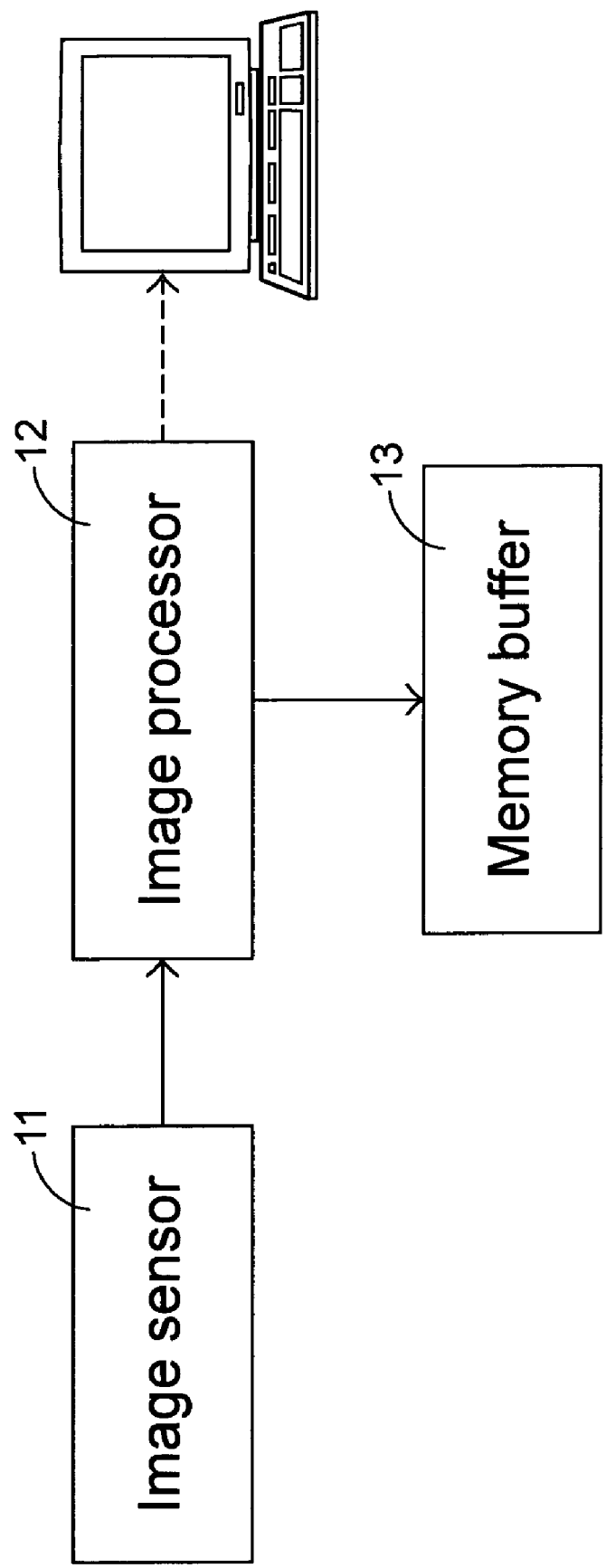
FIG. 1 is a schematic diagram illustrating a typical real-time image transmission architecture.

The method for processing an image frame according to the present invention will be illustrated hereinafter with reference to the architecture of FIG. 1. The memory buffer 13 of FIG. 1, however, has a size significantly smaller than that used conventionally. The image sensor 11 used in the present invention can also be a CMOS sensor or a CCD sensor, which results in an image frame in RGB or YCbCr format. The image processor 12 used in the present invention can also be a digital signal processor (DSP). For JPEG compression, an RGB to YCbCr conversion is performed in advance if the image sensor 11 generates an image frame in RGB format. In the JPEG compression procedure, image blocks having a size of 16×16 pixels or 8×8 pixels are generally taken as processing units for the sub-sampling procedure. That is, the image processor 12 will read 8 or 16 rows of image data from the memory buffer 13 at a time to meet the sub-sampling algorithm. Hence, according to an embodiment of the present invention applicable to JPEG compression, the memory buffer 13 includes a plurality of storage spaces and each storage space is set to be capable of accommodating 8 or 16 rows of image data. The plurality of storage spaces can be used to respectively store portions of the image frame and output the stored portions for JPEG compression sequentially. Basically, two or three storage spaces are enough for image-frame processing according to the present invention by alternating the data-transfer and data-compression procedures of these storage spaces. The sub-sampling algorithm used herein is well known to those skilled in the art, which for example can be 4:4:4, 4:2:2, 4:2:0 or 2:1:1 sub-sampling, and will not be described in detail herein.

Figure 2:
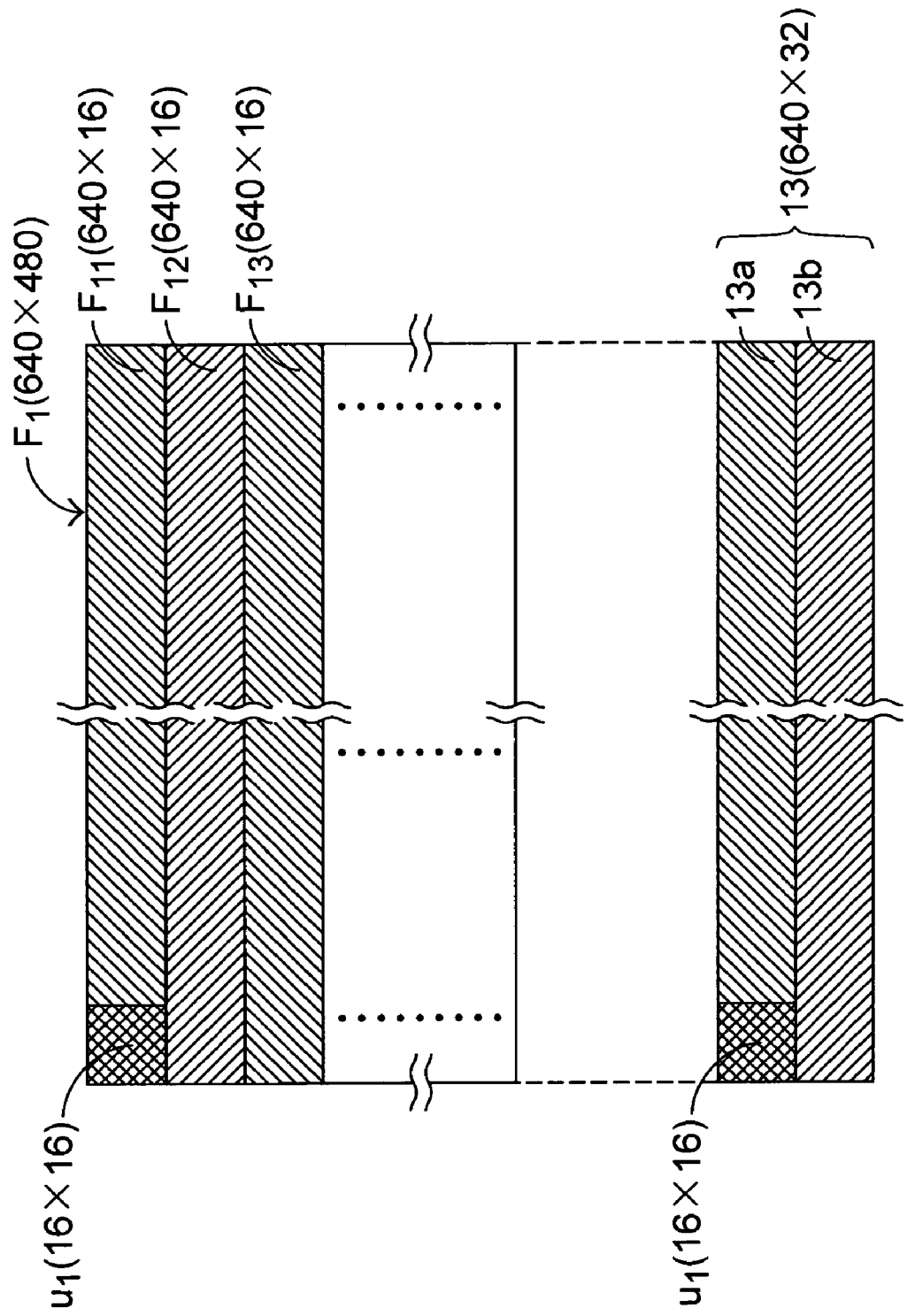
FIG. 2 is a schematic diagram illustrating the use of a 640×32 memory buffer to process a 640×480 image frame under a dual-buffer architecture according to the first embodiment of the present invention.

Please refer to FIG. 2 which is a schematic diagram illustrating the method for processing a 640×480 image frame $F_1$ according to the present invention, which is implemented with a dual-buffer architecture. In this embodiment, a 640×32 memory buffer 13 is patterned to consist of two 640×16 volatile storage spaces 13a and 13b, and the image frame $F_1$ is transferred into the two storage spaces 13a and 13b portion by portion for JPEG compression.

For processing the image frame $F_1$, a 640×16 image portion $F_{11}$ is first stored into the first storage space 13a. Then the next 640×16 image portion $F_{12}$ is received and stored into the second storage space 13b while the image processor 12 is carrying out a JPEG compression procedure on the image portion $F_{11}$ stored in the first storage space 13a. In this embodiment, the basic processing unit $u_1$ for JPEG compression is 16×16 pixels. Afterwards, a subsequent 640×16 image portion $F_{13}$ is received and stored into the first storage space 13a and overwrites the image portion $F_{11}$ having completed JPEG compression. Meanwhile, the image processor 12 carries out a JPEG compression procedure on the image portion $F_{12}$ stored in the second storage space 13b. By repeating the above steps to alternately update and process the image portions in the two storage spaces 13a and 13b, the image frame $F_1$ can be completely processed by the image processor 12 with the buffering of the small-sized memory buffer.

Alternatively, the processing of the 640×480 image frame $F_1$ can be implemented with a tri-buffer architecture, wherein a 640×48 memory buffer 23 is used and patterned to consist of three 640×16 volatile storage spaces 23a, 23b and 23c, as shown in FIG. 3. The image frame $F_1$ is transferred into the three storage spaces 23a, 23b and 23c portion by portion for JPEG compression.

For processing the image frame $F_1$, two 640×16 image portions $F_{11}$ and $F_{12}$ are first stored into the first storage space 23a and the second storage space 23b, respectively. Then next 640×16 image portion $F_{13}$ is received and stored into the third storage space 23c while the image processor 12 is carrying out a JPEG compression procedure on the image portion $F_{11}$ stored in the first storage space 23a. Like the previous embodiment, the basic processing unit $u_1$ for JPEG compression is 16×16 pixels. Afterwards, a subsequent 640×16 image portion $F_{14}$ is received and stored into the first storage space 23a and overwrites the image portion $F_{11}$ having completed JPEG compression. Meanwhile, the image processor 12 carries out a JPEG compression procedure on the image portion $F_{12}$ stored in the second storage space 23b. By repeating the above steps to alternately update and process the image portions in the three storage spaces 23a, 23b and 23c, the image frame $F_1$ can be completely processed by the image processor 12 with the buffering of the small-sized memory buffer.

Figure 4A:
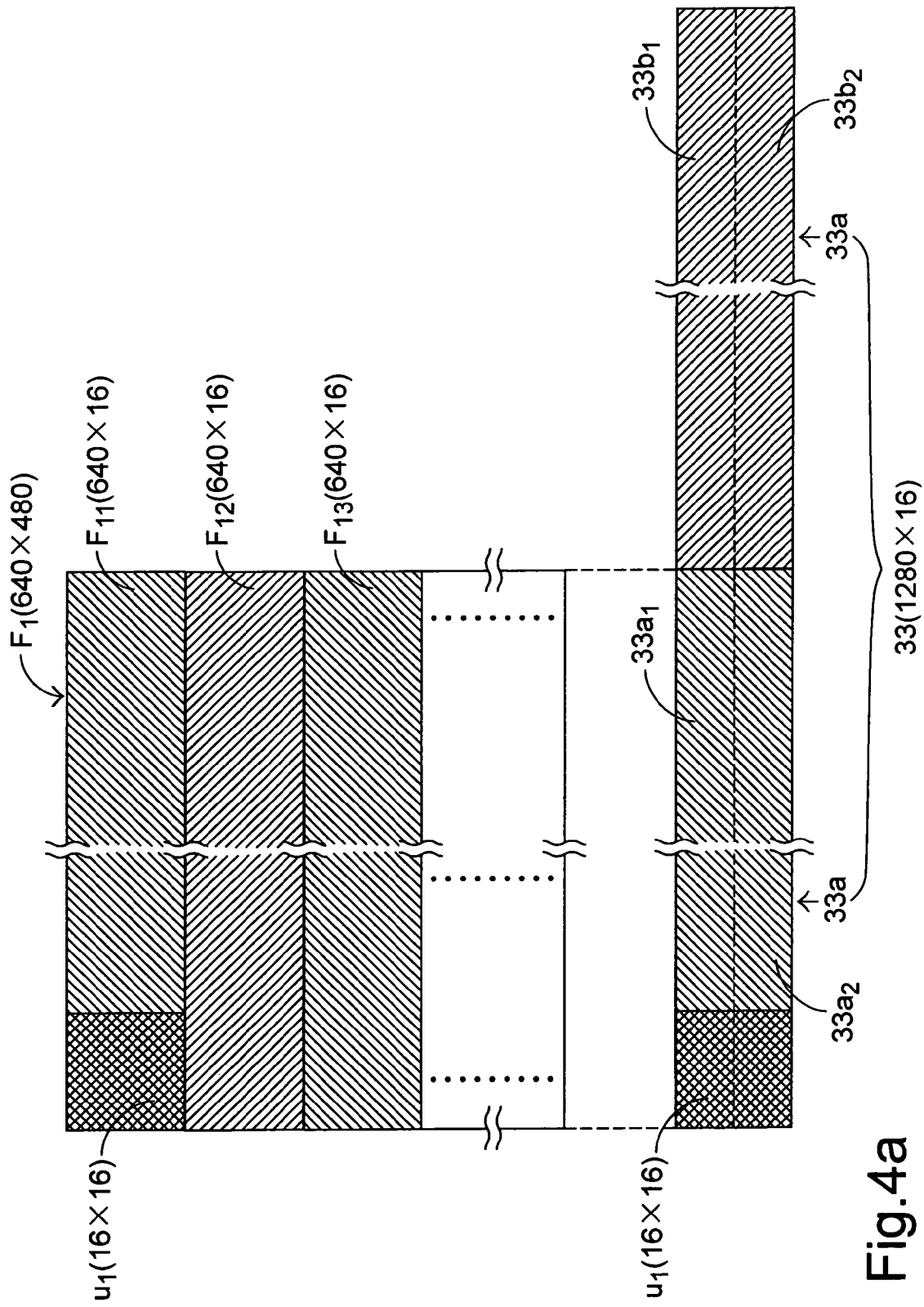
FIGS. 4a and 4b are schematic diagrams illustrating the use of a 1280×16 memory buffer to process image frames with various sizes according to the third embodiment of the present invention.

When a larger-size frame, e.g. 1280×1024, is to be processed, a 1280×16 memory buffer 33 is properly used. By patterning the memory buffer 33 to consist of four 640×8 storage portions, either the larger 1280×1024 frame or the smaller 640×480 frame can be processed under a dual-buffer architecture. Please refer to FIG. 4a which is a schematic diagram illustrating the method for processing a 640×480 image frame $F_1$ according to the present invention. The memory buffer 33 consists of four 640×8 storage parts $33a_1$, $33a_2$, $33b_1$ and $33b_2$. For receiving and storing the 640×16 image portions $F_{11}$, $F_{12}$, $F_{13}$, etc., the storage parts $33a_1$ and $33a_2$ are combined to provide a 640×16 storage space 33a, and the other two storage parts $33b_1$ and $33b_2$ are combined to provide another 640×16 storage space 33b. Hence, the image frame $F_1$ is transferred into the two storage spaces 33a and 33b portion by portion for JPEG compression.

In more detail, a 640×16 image portion $F_{11}$ is first stored to occupy the storage space 33a. Then next 640×16 image portion $F_{12}$ is received and stored to occupy the second storage space 33b while the image processor 12 is carrying out a JPEG compression procedure on the image portion $F_{11}$. In this embodiment, the basic processing unit $u_1$ for JPEG compression is 16×16 pixels. Afterwards, a subsequent 640×16 image portion $F_{13}$ is received and overwrites the image portion $F_{11}$ having completed JPEG compression to take over the first storage space 33a. Meanwhile, the image processor 12 carries out a JPEG compression procedure on the image portion $F_{12}$ occupying the second storage space 33b. By repeating the above steps to take advantages of the two storage spaces 33a and 33b and sequentially process the image portions, the image frame $F_1$ can be completely processed by the image processor 12 with the buffering of the small-sized memory buffer.

Figure 4B:
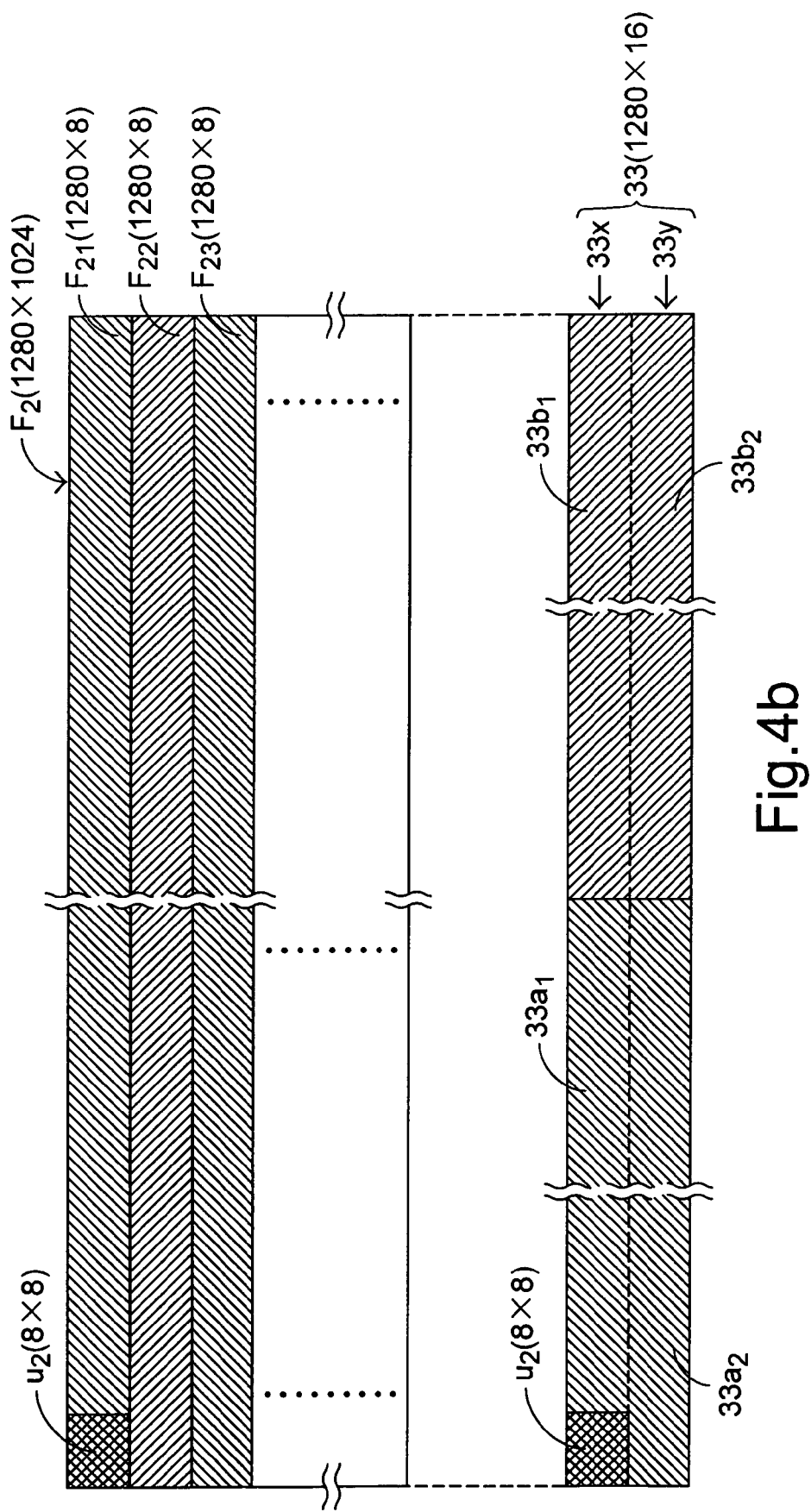

On the other hand, the memory buffer 33 consisting of the four 640×8 storage parts $33a_1$, $33a_2$, $33b_1$ and $33b_2$ is used for processing a 1280×1024 image frame $F_2$, as shown in FIG. 4b. In this embodiment, 2:1:1 sub-sampling is adopted, and the basic processing unit $u_2$ for JPEG compression is 8×8 pixels. For receiving and storing the 1280×8 image portions $F_{21}$, $F_{22}$, $F_{23}$, etc., the storage parts $33a_1$ and $33b_1$ are combined to provide a 1280×8 storage space 33x, and the other two storage parts $33a_2$ and $33b_2$ are combined to provide another 1280×8 storage space 33y. The two 1280×8 storage spaces 33x and 33y alternately receive 1280×8 image portions and output them for JPEG compression in sequence. As described in the above embodiments, by repeating the steps to take advantages of the dual-buffer architecture of the memory buffer 33 and sequentially store and process the image portions $F_{21}$, $F_{22}$, $F_{23}$, etc., the image frame $F_2$ can be completely processed by the image processor 12 with the buffering of the small-sized memory buffer.

When an even larger-size frame, e.g. 1920×1440, is to be processed, a 1920×24 memory buffer 43 is properly used. By patterning the memory buffer 43 to consist of nine 640×8 storage portions, the 1920×1440 frame can be processed under a tri-buffer architecture. Moreover, the smaller 640×480 frame or 1280×1024 frame can also be processed under a tri-buffer architecture with this 1920×24 memory buffer 43. Please refer to FIG. 5a which is a schematic diagram illustrating the method for processing a 640×480 image frame $F_1$ according to the present invention. The memory buffer 43 consists of nine 640×8 storage parts $43a_1$, $43a_2$, $43a_3$, $43b_1$, $43b_2$, $43b_3$, $43c_1$, $43c_2$ and $43c_3$. For receiving and storing the 640×16 image portions $F_{11}$, $F_{12}$, $F_{13}$, $F_{14}$, etc., the two storage parts $43a_1$ and $43a_2$ are combined to provide a 640×16 storage space 43a, another two storage parts $43b_1$ and $43b_2$ are combined to provide another 640×16 storage space 43b, and further two storage parts $43c_1$ and $43c_2$ are combined to provide a further 640×16 storage space 43c. Accordingly, the image frame $F_1$ is transferred into the three storage spaces 43a, 43b and 43c portion by portion for JPEG compression.

For processing the image frame $F_1$, two 640×16 image portions $F_{11}$ and $F_{12}$ are first stored into the first storage space 43a and the second storage space 43b, respectively. Then the next 640×16 image portion $F_{13}$ is received and stored into the third storage space 43c while the image processor 12 is carrying out a JPEG compression procedure on the image portion $F_{11}$ stored in the first storage space 43a. In this embodiment, the basic processing unit $u_1$ for JPEG compression is 16×16 pixels. Afterwards, a subsequent 640×16 image portion $F_{14}$ is received and stored into the first storage space 43a and overwrites the image portion $F_{11}$ having completed JPEG compression. Meanwhile, the image processor 12 carries out a JPEG compression procedure on the image portion $F_{12}$ stored in the second storage space 43b. By repeating the above steps to alternately update and process the image portions in the three storage spaces 43a, 43b and 43c, the image frame $F_1$ can be completely processed by the image processor 12 with the buffering of the small-sized memory buffer.

Figure 5A:
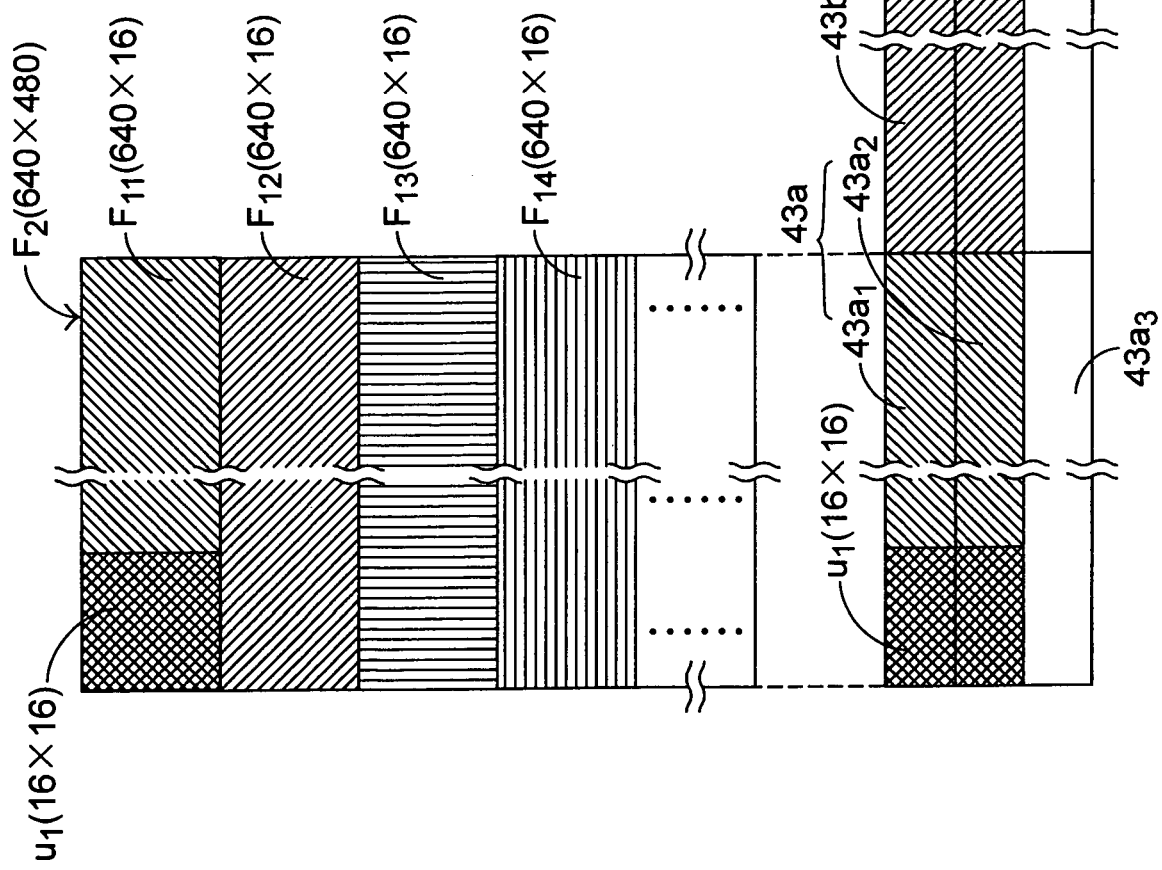
Figure 5B:
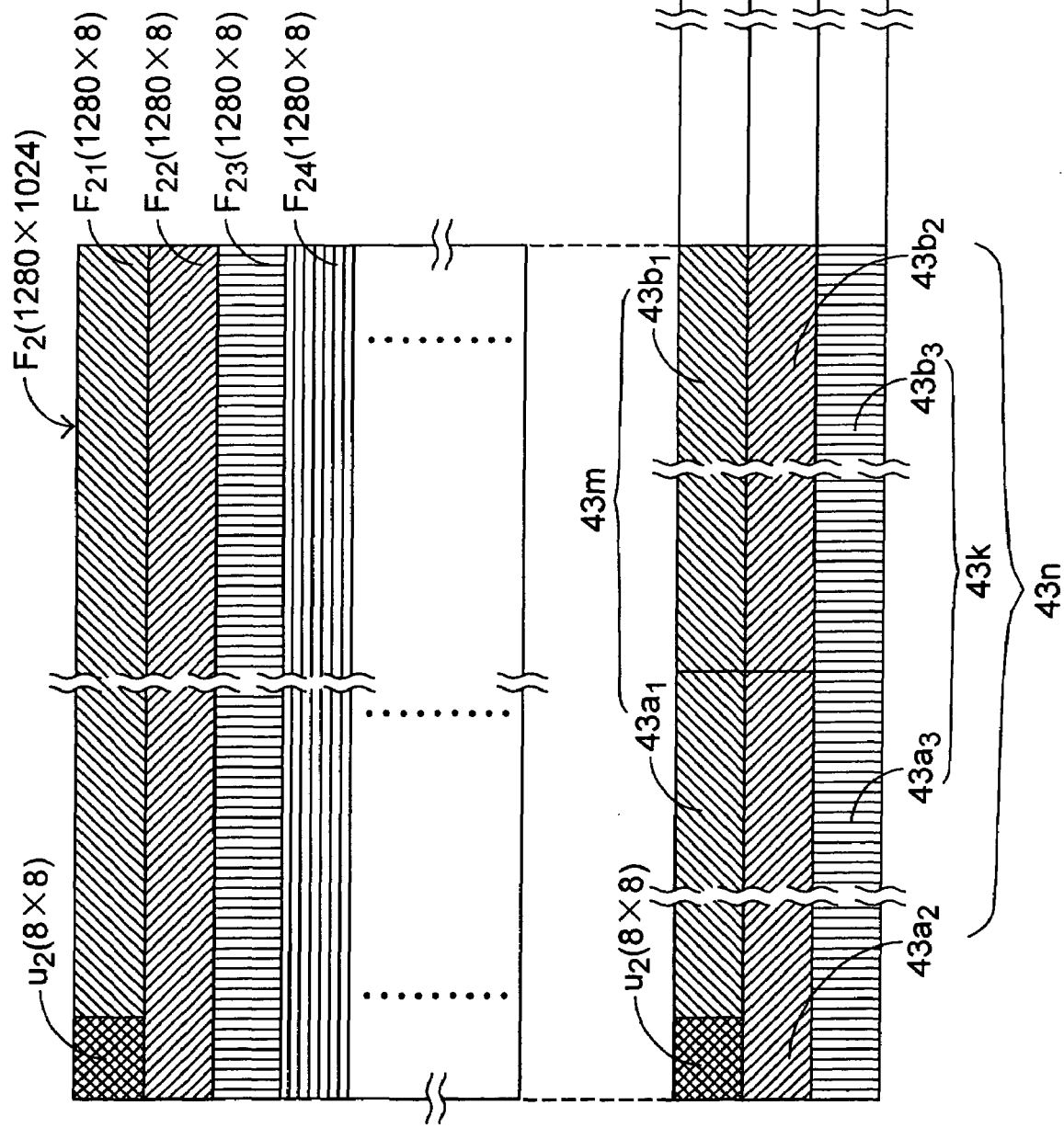

The memory buffer 43 consisting of nine 640×8 storage parts $43a_1$, $43a_2$, $43a_3$, $43b_1$, $43b_2$, $43b_3$, $43c_1$, $43c_2$ and $43c_3$ is also used for processing a 1280×1024 image frame $F_2$, as shown in FIG. 5b. In this embodiment, 2:1:1 sub-sampling is adopted, and the basic processing unit $u_2$ for JPEG compression is 8×8 pixels. For receiving and storing the 1280×8 image portions $F_{21}$, $F_{22}$, $F_{23}$, $F_{24}$, etc., the storage parts $43a_1$ and $43b_1$ are combined to provide a 1280×8 storage space 43m, another two storage parts $43a_2$ and $43b_2$ are combined to provide another 1280×8 storage space 43n, and further two storage parts $43a_3$ and $43b_3$ are combined to provide a further 1280×8 storage space 43k. The three 1280×8 storage spaces 43m, 43n and 43k alternately receive 1280×8 image portions $F_{21}$, $F_{22}$, $F_{23}$, $F_{24}$, etc. and output them for JPEG compression in sequence. By repeating the steps similar to that described above with reference to FIG. 5a to take advantages of the tri-buffer architecture of the memory buffer 43 and sequentially store and process the image portions $F_{21}$, $F_{22}$, $F_{23}$, $F_{24}$, etc., the image frame $F_2$ can be completely processed by the image processor 12 with the buffering of the small-sized memory buffer.

Furthermore, the memory buffer 43 consisting of nine 640×8 storage parts $43a_1$, $43a_2$, $43a_3$, $43b_1$, $43b_2$, $43b_3$, $43c_1$, $43c_2$ and $43c_3$ is also applicable to process a 1920×1440 image frame $F_3$, as shown in FIG. 5c. In this embodiment, 2:1:1 sub-sampling is also adopted, and the basic processing unit $u_2$ for JPEG compression is 8×8 pixels. For receiving and storing the 1920×8 image portions $F_{31}$, $F_{32}$, $F_{33}$, $F_{34}$ etc., the three storage parts $43a_1$, $43b_1$, and $43c_1$ are combined to provide a 1920×8 storage space 43x, another three storage parts $43a_2$, $43b_2$ and $43c_2$ are combined to provide another 1920×8 storage space 43y, and the other three storage parts $43a_3$, $43b_3$ and $43c_3$ are combined to provide the other 1920×8 storage space 43z. The three 1920×8 storage spaces 43x, 43y and 43z alternately receive 1920×8 image portions $F_{31}$, $F_{32}$, $F_{33}$, $F_{34}$, etc. and output them for JPEG compression in sequence. By repeating the steps similar to that described above with reference to FIG. 5a to take advantages of the tri-buffer architecture of the memory buffer 43 and sequentially store and process the image portions $F_{31}$, $F_{32}$, $F_{33}$, $F_{34}$, etc., the image frame $F_3$ can be completely processed by the image processor 12 with the buffering of the small-sized memory buffer.

Although not specifically described, it should be understood that the 1920×1440 image frame $F_3$ can also be processed under a dual-buffer architecture by providing a 1920×16 memory buffer patterned to consist of two 1920×8 storage spaces while selecting the basic processing unit $u_2$ for JPEG compression as 8×8 pixels.

In the above embodiments, 640×480, 1280×1024 and 1920×1440 image frames are exemplified for illustrating the present image-frame processing method. It is to be noted that the present invention can also be used to process other size of image frame such as 352×288, 704×480, 704×576, 1024×768, 1152×864, 1440×900, 1600×1200, etc. Furthermore, though the image frames are subjected to JPEG compression in the above embodiments, the present invention can be similarly applied for MPEG processing. From the above embodiments, it is understood that the required storage capacity of the volatile memory 13 is significantly reduced as compared with the prior art. The reduced size will facilitate the integration of the volatile memory 13 with the image processor 12.

Figure 6A:
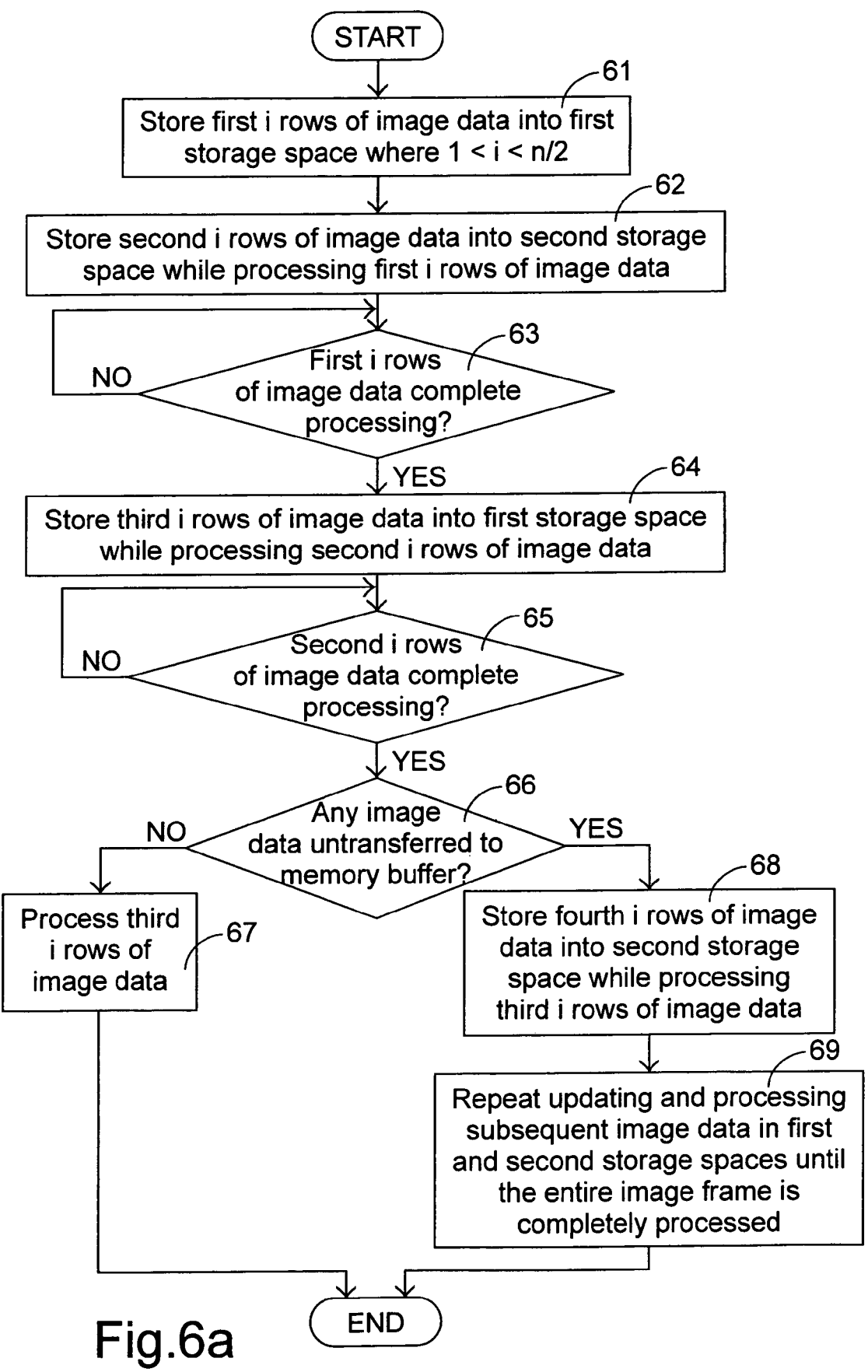
FIG. 6a is a flowchart illustrating an image frame processing method under a dual-buffer architecture according to the present invention.

Though the above embodiments are exemplified to be applied to JPEG compression, the present image processing method can be applied to other suitable fields. A flowchart shown in FIG. 6a is used to summarize an image processing method according to the present invention wherein two storage spaces of the memory buffer are used to store an image frame consisting of m columns and n rows of image data, i.e. dual-buffer architecture. First, the first i rows (row 1~row i) of image data are stored into a first storage space of the memory buffer where 1<i<n/2 (Step 61). Then, next i rows (row i+1~row 2i) of image data are stored into a second storage space of the memory buffer. In the meantime, the image processor processes the first i rows of image data (Step 62). After the first i rows of image data complete processing (Step 63), it is the turn of the second i rows to be processed by the image processor. Meanwhile, the third i rows (row 2i+1~row 3i) of image data overwrite the first i rows stored in the first storage space (Step 64). After the second i rows of image data complete processing (Step 65), it is the turn of the third i rows to be processed by the image processor (Step 67). If there are still rows of image data not transferred to the memory buffer yet (Step 66), the fourth i rows (row 3i+1~row 4i) of image data overwrite the second i rows stored in the second storage space while the third i rows is being processed by the image processor (Step 68). The alternate updating and processing procedures of image data described above are repeated till the entire image frame is completely processed (Step 69). Likewise, a tri-buffer architecture can be derived according to the above principles and illustrated in FIG. 6b.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A method for processing an image frame outputted from an image sensor by an image processor via the buffering of a memory buffer, comprising steps of:
    patterning a memory buffer for buffering an image to be processed to consist of a plurality of storage parts in each row and each column;
    dividing said image frame to be processed into a plurality of image portions;
    selectively combining said storage parts in the same row when each of said image portions is of a first size and combining said storage parts in the same column when each of said image portions is of a second size so as to provide at least two storage spaces, each of which has a size corresponding to the size of said image portions;
    sequentially storing said image portions into said storage spaces in turn; and
    sequentially processing said image portions stored in said memory buffer.

2. The method according to claim 1 wherein said processing step for processing a previously stored image portion and said storing step for storing a subsequent image portion are performed simultaneously.

3. The method according to claim 1 wherein each of said storage spaces consists of at least two of said storage parts.

4. The method according to claim 1 wherein each of said storage parts has a size of 640×8, and said memory buffer has a size of 1280×16, thereby providing four storage parts and two storage spaces.

5. The method according to claim 4 wherein said first size is 1280×8, and said second size is 640×16.

6. The method according to claim 1 wherein each of said storage parts has a size of 640×8, and said memory buffer has a size of 1920×24, thereby providing nine storage parts and two or three storage spaces.

7. The method according to claim 6 wherein said first size is 1280×8 or 1920×8, and said second size is 640×16.

8. The method according to claim 1 wherein said image portions include at least first, second and third image portions, said memory buffer includes at least first and second storage spaces, and said step of sequentially storing said image portions into said storage spaces in turn is performed by:
    storing the first image portion into the first storage space;
    storing the second image portion into the second storage space while performing a first image-processing operation of the first image portion stored in the first storage space; and
    storing the third image portion into the memory buffer while performing a second image-processing operation of the second image portion stored in the second storage space.

9. The method according to claim 8 wherein said first image-processing operation and said second image-processing operation are JPEG or MPEG compression operations based on sub-sampling algorithm.

\* \* \* \* \*